US005697753A

United States Patent [19]
Aurora et al.

[11] Patent Number: 5,697,753
[45] Date of Patent: Dec. 16, 1997

[54] SEMIAUTOMATIC STACKER FOR STACKABLE ARTICLES

[75] Inventors: Desh D. Aurora, Plano; Brian T. Criswell, Grand Prairie; Andrew Fisher, Coppell; Min Chul Kim, Irving, all of Tex.

[73] Assignee: Recot, Inc., Pleasanton, Calif.

[21] Appl. No.: 530,433

[22] Filed: Sep. 19, 1995

[51] Int. Cl.⁶ ................................................ B65G 67/08
[52] U.S. Cl. ................................ 414/398; 414/794.5
[58] Field of Search .................................. 414/390, 391, 414/392, 393, 398, 502, 505, 523, 528, 794.5, 794.4, 340, 341, 346, 347; 198/460.1, 464.4

[56] References Cited

U.S. PATENT DOCUMENTS

| Re. 33,416 | 10/1990 | Konishi et al. | 364/478 |
|---|---|---|---|
| 1,518,278 | 12/1924 | Schroeder et al. | |
| 2,360,146 | 10/1944 | Lima. | |
| 2,673,627 | 3/1954 | Stava et al. | 188/165 |
| 3,030,107 | 4/1962 | Stidwill | 414/794.5 |
| 3,651,963 | 3/1972 | McWilliams. | |
| 3,705,410 | 12/1972 | Kooy et al. | |
| 3,717,263 | 2/1973 | McWilliams. | |
| 3,779,404 | 12/1973 | McWilliams. | |
| 3,819,068 | 6/1974 | Weir. | |
| 3,885,682 | 5/1975 | McWilliams. | |
| 3,913,757 | 10/1975 | Lovey. | |
| 3,931,897 | 1/1976 | Bacon et al. | 414/794.5 |
| 4,093,084 | 6/1978 | Ringer. | |
| 4,103,789 | 8/1978 | Andrews et al. | |
| 4,279,555 | 7/1981 | Rydell | 414/794.5 |
| 4,281,955 | 8/1981 | McWilliams | 414/398 |
| 4,355,712 | 10/1982 | Bruno | 198/460.1 |
| 4,692,876 | 9/1987 | Tenma et al. | 364/513 |
| 4,729,467 | 3/1988 | Vanderlinde | 198/586 |
| 4,813,526 | 3/1989 | Belanger | 198/313 |
| 4,828,102 | 5/1989 | Dotson et al. | 198/588 |
| 5,007,521 | 4/1991 | Tanaka | 198/347.4 |
| 5,009,560 | 4/1991 | Ruder et al. | 414/392 |
| 5,015,145 | 5/1991 | Angell et al. | 414/547 |
| 5,050,090 | 9/1991 | Golub et al. | 364/478 |
| 5,052,882 | 10/1991 | Blau et al. | 414/667 |
| 5,088,873 | 2/1992 | Ruder et al. | 414/392 |
| 5,175,692 | 12/1992 | Mazouz et al. | 364/478 |
| 5,203,671 | 4/1993 | Cawley et al. | 414/791.6 |
| 5,222,857 | 6/1993 | Hasegawa | 414/788.4 |
| 5,325,953 | 7/1994 | Doster et al. | 198/304 |
| 5,372,473 | 12/1994 | Moyden et al. | 414/788.4 |
| 5,380,139 | 1/1995 | Pohjonea et al. | 414/280 |
| 5,391,038 | 2/1995 | Stewart | 414/392 |
| 5,391,046 | 2/1995 | Colamussi | 414/667 |
| 5,403,142 | 4/1995 | Stewart | 414/392 |

FOREIGN PATENT DOCUMENTS

| 2462373 | 3/1981 | France | 414/794.5 |
|---|---|---|---|
| 6024566 | 2/1994 | Japan | 414/398 |
| 8803907 | 6/1988 | WIPO | 414/398 |

*Primary Examiner*—Thomas J. Brahan

[57] ABSTRACT

A box stacker uniquely able to semiautomatically load, in place, inside a variety of enclosures, columns of stackable boxes, said box stacker being in the form of a movable structure that has a conveyor belt carrying structure attached thereto in a cantilevered fashion. The conveyor belt carrying structure has an inner end and an outer end and carries spaced boxes thereon to be stacked. A speed-up belt carrying structure has an inner end attached to the outer end of the conveyor belt carrying structure and receives boxes from the conveyor belt. A lift device automatically raises the conveyor belt carrying structure in predetermined increments to successively deposit boxes on a column or stack and a drive arrangement is coupled to the speed-up belt for driving the speed-up belt at a greater speed than the conveyor belt to eject the boxes from the speed-up belt onto the column or stack.

9 Claims, 9 Drawing Sheets

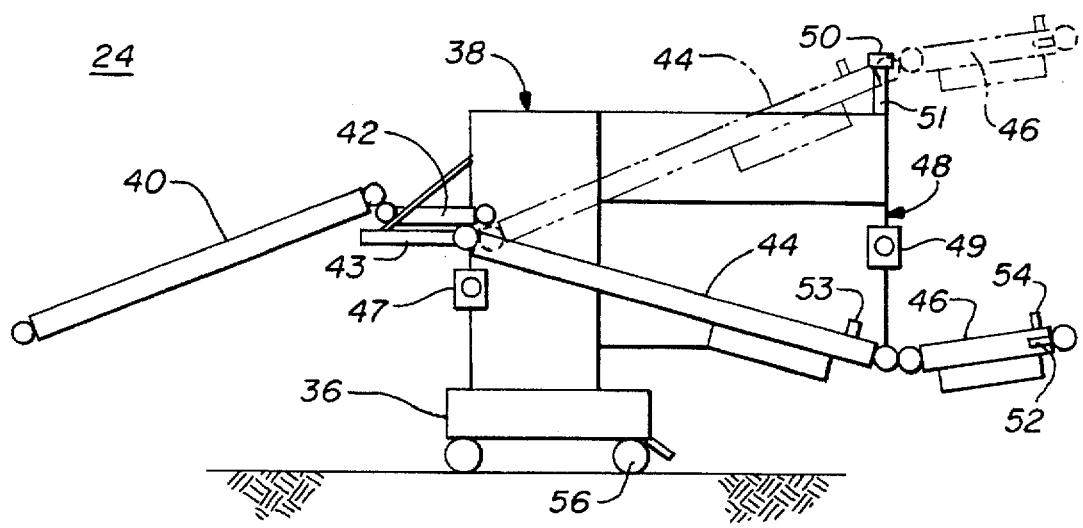
FIG. 2
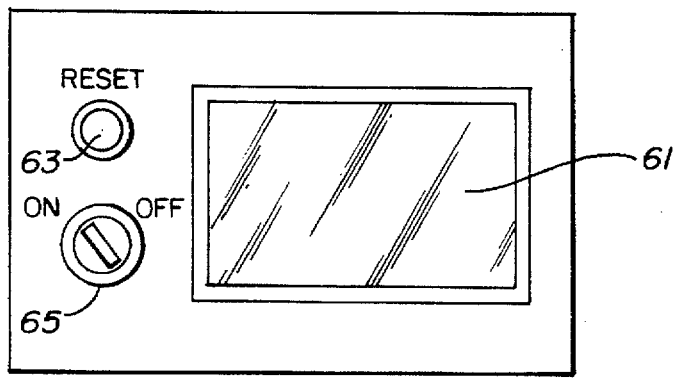
FIG. 3
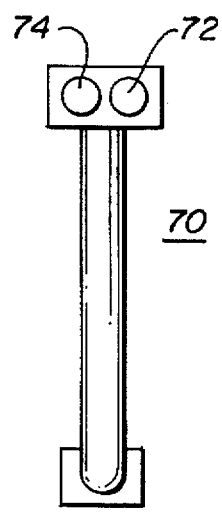
FIG. 5
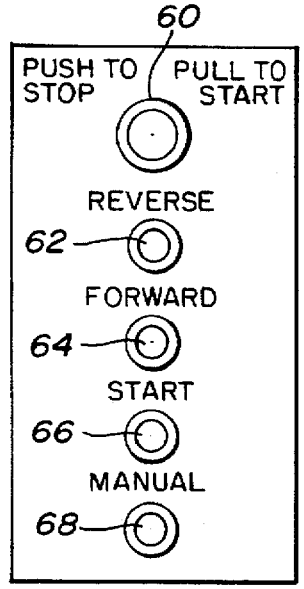
FIG. 4A
FIG. 4B

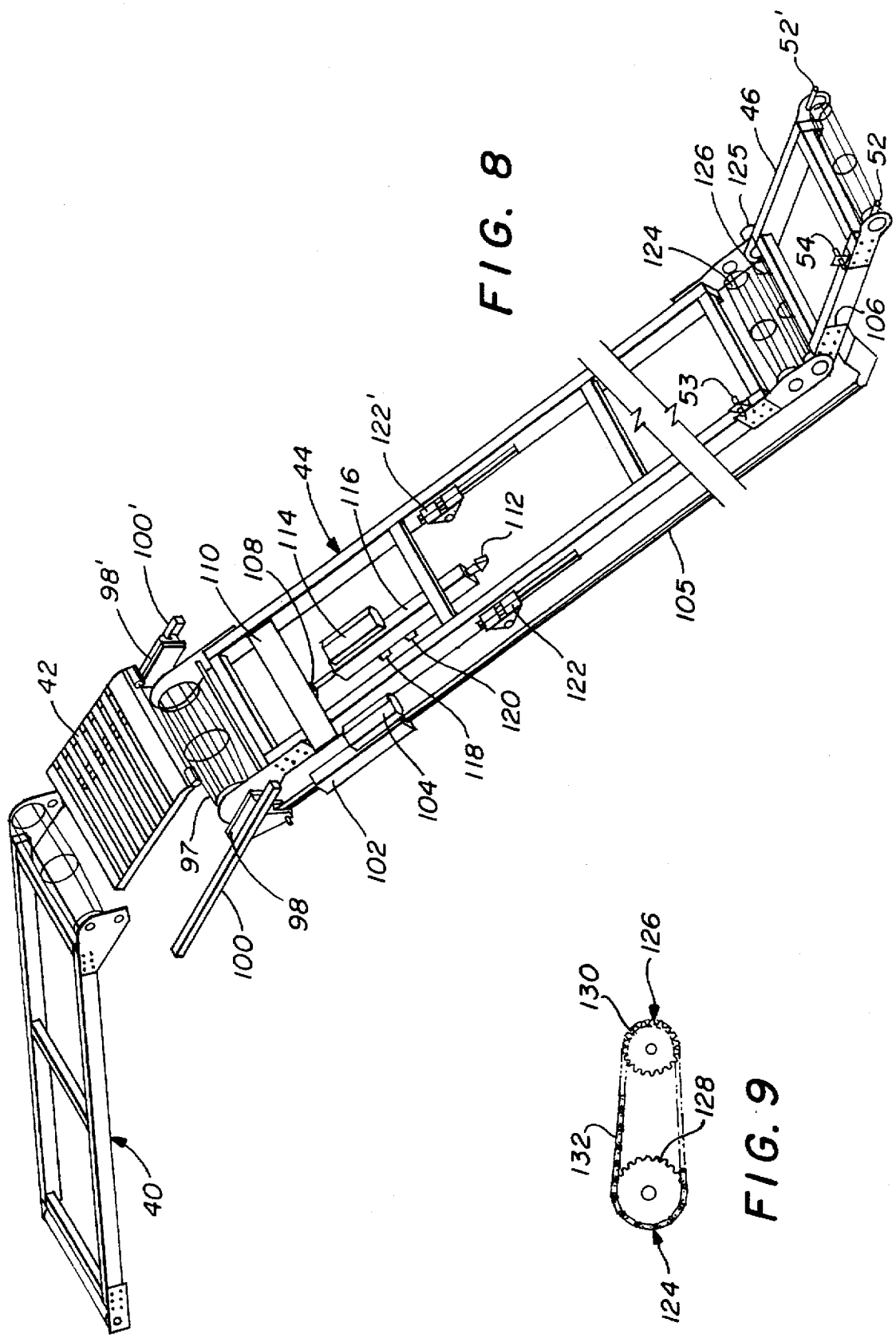

SEMIAUTOMATIC STACKER FOR STACKABLE ARTICLES

BACKGROUND OF THE INVENTION

1. Field of the Invention

The present invention relates generally to a device for stacking articles and in particular to a semiautomatic stacker for stacking boxes in enclosed areas such as van-type trucks.

2. Description of Related Art

An important factor in transporting products involves time-consuming loading operations of cargo vehicles. In order to reduce transportation expenses, there have been many different methods proposed for loading vehicles to reduce the amount of manual labor required. Some efforts in this area have related to preassembling the load outside of the vehicle and then carrying, pushing, or sliding the preassembled load into the vehicle.

Some devices, such as that disclosed in U.S. Pat. No. 4,813,526, rely on improved mobile conveyor units to carry the products into the interior of the cargo vehicle where the products are stacked. In such case, first and second operator stations are provided to control the operation of the conveyor. With these conveyors, the stacker is moved horizontally, vertically, and forward and backward by the operator.

In still other system, such as disclosed in U.S. Pat. No. 5,325,953, multiple section conveyors are used for positioning of loose items for manual stacking. The system provides cargo items to a work crew at a controlled rate and at a proper height for safest handling.

Still other systems, such as disclosed in U.S. Pat. No. 5,015,145, automatically load a cargo compartment of a vehicle by maximizing the utilization of available space within the vehicle by determining an optimum load configuration based on various parameters of the vehicle and the containers to be loaded. A self-propelled robot loader is used to load the cargo compartment based on the determined optimum load configuration and then automatically withdraws after the loading is completed. In this system, each article, such as a box, must be individually gripped by a gripper unit, pivoted forwardly in a vertical plane, and raised to the proper height and placed on top of the stack. Clearly such a system not only requires time for the unit to pivot rearwardly to pick up a box but also to pivot forwardly to stack the box. In addition, the boxes have to be stacked upside down either on their way to the loader or after they are picked up by the gripper arm and stacked.

It would be advantageous to have a semiautomatic loading system in which cargo vans of various construction could be automatically loaded in stacks at a high rate of speed and with increased efficiency.

SUMMARY OF THE INVENTION

It would he helpful to have a semiautomatic box stacker so constructed that the outer end of the conveyor depositing the boxes maintains or follows a vertical line as it moves between a lowest point and a highest point. Further, it would be helpful to eject the boxes from the conveyor in an arc so that each box sets down smoothly on top of the last box. It would also be helpful to have a semiautomatic box stacker including a means to determine the height of a deposited box so as to stop upper movement of the conveyor belt at the proper location to deposit the next box. Further, it would be advantageous if such a semiautomatic box stacker included a device for determining when a column is full and there is no room between the roof of an enclosed cargo container and the last box for the next given box size.

It would also be helpful to anticipate the deposit of a box on top of the last box so that movement of the inclined conveyor could be started upwardly to the next position without any delay. This would increase the speed at which the articles are stacked. Jam detectors should also be provided to shut down the system if a box or article is not moving past a certain point within a certain period of time. Also, the spacing between boxes or articles should be verified so that if they are too close together, movement of the boxes on one conveyor will be paused to allow boxes on the next belt to be ejected.

Since such a system is semiautomatic, it is helpful to provide the operator with controls to move the semiautomatic stacker forwards or backwards any desired amount. Since articles are stacked in rows, it would also be helpful if the device could back itself up exactly one box distance when a row of boxes has been completed. Further, it would be helpful to provide such a device with the ability to load enclosed cargo containers that are of different construction such as E-vans, drop frames, and straight frames.

Also, it would be important in such a device to be able to move the outer end of the device containing the conveyors in a horizontal arc to stack the boxes in various columns and to be able to lock the movable portion to the fixed portion during the stacking of a particular column.

The present invention provides all of these advantages. It has a conveyor system including a feed conveyor, a transfer conveyor, an incline conveyor and a speed-up conveyor mounted to a frame portion such that the incline conveyor can move upwardly and downwardly in the frame portion in such a manner that the outer end of the incline conveyor maintains or follows a vertical line as it moves between a lowest point and a highest point. The incline conveyor is attached to the frame portion by both vertically sliding bearings and horizontally sliding bearings that allow the incline conveyor portion to move both vertically and in a horizontal direction parallel to itself. A processor control unit, when moving the incline conveyor upwardly in steps to stack the boxes, at the same time drives a linear actuator to slide the incline conveyor backwards and forwards so that the outer end thereof maintains or follows the vertical plane.

The device also enables the speed-up belt on the outer end to normally maintain an angle with respect to the horizontal of preferably 10° but may be in the range of 0° to 20° depending upon the size and type of box and its manner of seal or fold pattern. However, at the bottom of a stack, the speed-up conveyor is substantially in longitudinal alignment with the incline conveyor to drop the first box on the floor. By maintaining the speed-up belt at a preferred angle of 10° with respect to the horizontal, boxes subsequent to the first box are ejected in an arc as the incline conveyor moves upwardly so that each box sets down smoothly on top of the last box.

First and second spaced photocells are placed in the outer end of the speed-up conveyor to determine the height of the last deposited box so as to stop the upper movement of the incline conveyor belt at the proper location to deposit the next box. In other words, the incline conveyor is moved upwardly until the photocells no longer detect the presence of the box that was last deposited. It then stops and deposits the next box on top of the last box.

A third photocell is mounted on the frame portion that determines when a column is full and there is no room between the roof of the enclosed vehicle and the last box for the next given size box. In other words, if the next box is too high to fit into the space available, the third photocell detects that height and stops the unit so that it can be repositioned for the next stack.

A fourth laterally focused photocell on the speed-up conveyor detects the presence of a box thereon. Since that box is going to be ejected in a very short period of time on top of the last box that was deposited on the stack, this photocell anticipates the deposit of the detected box on top of the last box and signals the computer to start movement of the incline conveyor upwardly to the next position. This overcomes delays that are inherent in the system so that the system does not have to wait until the box is deposited, the computer then notified, and the incline conveyor then raised so that the next box can be deposited. The system therefore acts before the box is deposited so that the operation of the system is substantially continuous without having to wait for one box to be stacked before it begins moving to the next position. The fourth laterally focused photocell also acts as a jam detector. If a box stops on the speed-up conveyor and does not pass the photocell within certain period of time, the fourth photocell shuts down the system. It also acts as a detector during manual mode operations. It allows odd sized boxes to be stacked manually by halting conveyor movement until the odd sized box is manually removed and then allows regular sized boxes to be stacked on top of the odd shaped boxes automatically as described previously.

A fifth laterally focused photocell is placed on the incline conveyor. It verifies the spacing between boxes. If the boxes are too close together, it will pause the movement of the incline conveyor for one second to allow the boxes on the speed-up belt to be ejected or, if the boxes are too far apart, it will speed-up the incline conveyor. This is the case where the incline conveyor and the speed-up conveyor are driven by separate motors. Where the incline conveyor drives the speed-up conveyor with a chain drive, the system shuts down when the boxes are too close together.

A jog button is provided on a control panel that enables the operator to move the base and frame portion forwards or backwards any desired amount. A motor is coupled to a drive wheel for moving the base. A back-up button is also provided which, if depressed, will cause the unit to back itself up exactly one box distance for the size box being stacked to enable the start of a new row of stacks. This information has been previously entered into the processor control unit for the size boxes being stacked.

The incline conveyor and the speed-up conveyor are cantilevered on the front end of the frame portion so that the nose of an enclosed trailer can be loaded even though the nose is higher than the normal floor of the trailer such as in an E-van or drop-frame construction. The cantilevered feature is also used to load a drop frame having wheel covers extending upwardly inside the van body.

As the frame moves in a horizontal arc to construct the various stacks of boxes, magnetic brakes are provided to lock the frame portion to the base portion when making a stack so that the frame portion cannot move with respect to the base portion. However, when the stack is completed and a "complete" button is depressed when the arm is coming back down to its lowest position, the magnetic brakes are released and the operator is allowed to manually reposition the frame laterally at the desired angle for the incline conveyor to stack the next column.

Thus, it is an object of the present invention to provide a novel semiautomatic box stacker with the outer end of a conveyor that follows a vertical line as it moves between a lowest point and a highest point during the formation of a stack of boxes.

It is also an object of the present invention to provide a semiautomatic box stacker with a speed-up belt on the outer end that is at an angle with respect to the horizontal to enable boxes to be ejected in an arc as the incline conveyor moves upwardly so that each box sets down smoothly on top of the last box. The speed-up belt moves faster than the incline conveyor belt that provides the boxes, thus providing a box ejection feature to the system.

It is still another object of the present invention to determine the height of a deposited box so as to stop the upward movement of the incline conveyor belt at the proper location to deposit the next box.

It is also an object of the present invention to provide a device such as a photocell mounted on the housing that determines when a column is full and there is no room between the roof of the enclosed vehicle and the last box for the next given sized box and thus stops all belts.

It is yet another object of the present invention to anticipate the deposit of a box on top of the last box in the stack and signal the computer to start movement of the incline conveyor upwardly to the next position to overcome delays that are inherent in the system so that the system does not have to wait until the box is deposited, the computer then notified and the incline conveyor then raised so that the next box can be deposited. Thus the novel invention provides operation of the system that is substantially continuous without having to wait for one box to be stacked before it begins moving to the next position.

It is yet another object of the present invention to provide a jam detector wherein, if a box stops on the speed-up conveyor and does not pass the jam detector within a certain period of time, the system is shut down.

It is still another object of the present invention to provide a device for verifying the spacing between boxes such that, if they are too close together, movement of the incline conveyor will be paused to allow boxes on the speed-up belt to be ejected or the system shuts down or, if the boxes are too far apart, the incline conveyor speed will be increased.

Still another object of the present invention is to provide a jog button on the control panel to enable the operator to move the base and the frame portion forwards or backwards any desired amount.

Still another feature of the present invention is a back-up button which, if depressed, will cause the unit to back itself up exactly one box distance for the size boxes being stacked.

The invention also relates to a semiautomatic box stacker which has a cantilevered conveyor on the outer end thereof so that the nose of the trailer can be loaded even though the nose is higher than the normal floor of the trailer.

Yet another object of the present invention is to use magnetic brakes to lock the frame portion to the base portion so that the frame portion cannot move with respect to the base portion when making a stack.

Thus the present invention relates to a semiautomatic stacker for stackable articles including a base structure having a front portion and a rear portion, a conveyor support structure mounted on the base and having a front portion and a rear portion, an incline conveyor having an article carrier thereon for moving the articles, the incline conveyor being both pivotally and slidably attached to the conveyor support structure for both horizontal and vertical movement with respect to the base structure, the incline conveyor having a receiving end for receiving articles and an outer end for depositing articles in a stack and controlled motors for automatically moving the incline conveyor inwardly, upwardly, and outwardly with respect to the conveyor support structure while stacking articles such that the outer end of the incline conveyor is selectively movable vertically in a substantially straight line from a lowest position to a highest position.

The invention also relates to a semiautomatic box stacker including a movable structure, a conveyor belt for carrying spaced boxes thereon to be stacked, a conveyor belt carrying structure having an inner end pivotally attached in a cantilevered fashion to the movable structure and an outer end, a speed-up belt for receiving boxes from the conveyor belt, a speed-up belt carrying structure having an inner end attached to the outer end of the conveyor belt carrying structure, lift means for automatically raising the conveyor belt carrying structure in predetermined increments to successively deposit boxes on a stack, and drive means on the movable structure for driving the speed-up belt at a greater speed than the conveyor belt to eject the boxes from the speed-up belt onto the stack.

BRIEF DESCRIPTION OF THE DRAWINGS

These and other objects of the present invention will be more fully disclosed in the following DETAILED DESCRIPTION OF THE PRESENT INVENTION in which like numerals represent like elements and in which:

FIG. 2 is a schematic illustration of a side view of the novel semiautomatic stacker of the present invention;

FIG. 3 is a plan view of a touch screen controller for a microprocessor to program the semiautomatic box stacker;

FIG. 4A is a plan view of the main control panel;

FIG. 4B is a schematic of a circuit for detecting article spacing;

FIG. 5 is a plan view of the operator handle with the complete stack control and the magnet release control;

FIG. 8 is a schematic view of the conveyor units utilized in the present invention;

FIG. 9 is an end view of the sprockets coupling the incline conveyor to the speed-up conveyor illustrating the difference in ratios of the diameters of the sprocket wheels to cause the speed-up belt to have a greater drive speed than the incline belt;

DETAILED DESCRIPTION OF THE PRESENT INVENTION

Figure 1A:
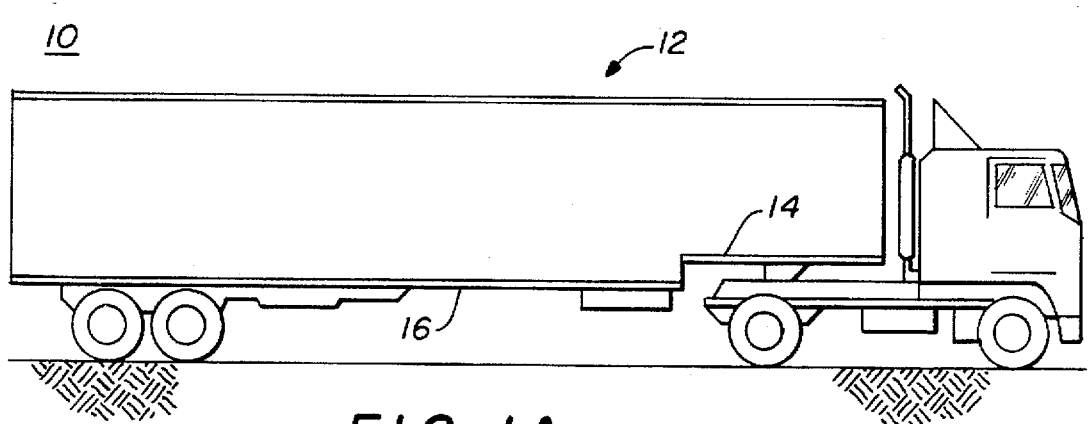
FIGS. 1A–1D illustrate various type of enclosed cargo units in which boxes can be stacked by the novel semiautomatic stacker of the present invention.

FIGS. 1A–1D disclose various types of enclosed vans that can be loaded by the semiautomatic box stacker of the present invention. In FIG. 1A, an E-van 10 is shown having an enclosed trailer portion 12 with a floor portion 16 and a raised deck portion 14 over the drive wheels.

Figure 1B:
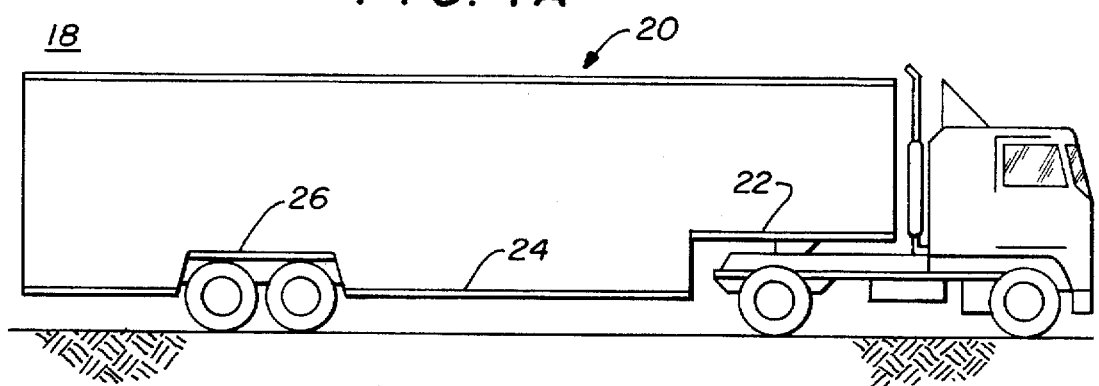
Figure 1C:
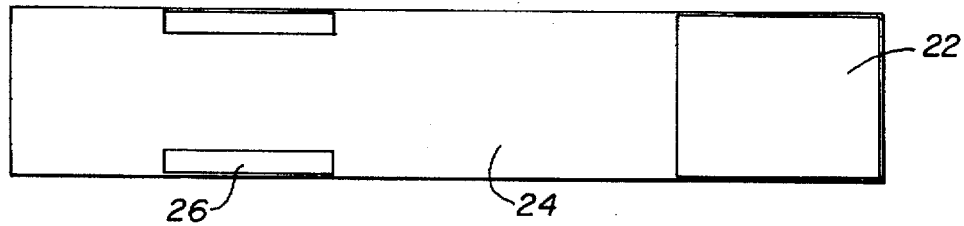

FIG. 1B is a side view of a van 18 known as a drop frame and includes the enclosed trailer portion 20 having an upper deck portion 22 over the drive wheels of the truck, a floor portion 24, and a raised portion 26 over the rear trailer wheels. FIG. 1C is a top view of the interior of the van 20 illustrating the upper deck 22, the lower deck 24, and the deck portions 26 over the rear wheels of the van.

Figure 1D:
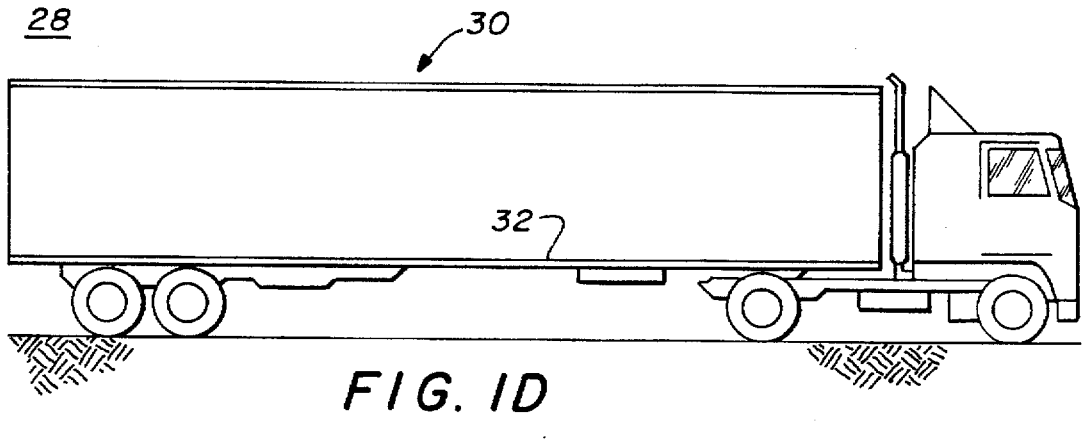

FIG. 1D is a side view of a straight frame van or box truck 28 having the enclosed van portion 30 with a straight flat floor 32.

The present invention is intended to be able to semiautomatically load or stack boxes in each of these enclosed vans as will be described hereafter.

FIG. 2 is a schematic view of the novel semiautomatic box stacker designated by the numeral 34. It is a case or box stacking machine for loading the boxes entering into the vans or trailers of FIG. 1 on belt conveyors. The stacking machine 34 is controlled by a programmable logic controller (PLC). The unit allows three axes of motion and has a vertical lift, an incline actuator which moves the incline conveyor in and out, a tilt actuator, and a drive motor. There is a vertical frame portion 38 pivotally mounted on a base portion 36. There are also a number of conveyors. There is the in-feed conveyor 40, the transitional conveyor 42, the incline conveyor 44, and the speed-up conveyor 46. The motions of the machine are all controlled through digital inputs and outputs from the PLC. The state of the machine is tracked through sensors and timers as will be discussed hereafter. The conveyor support structure 38 has a frame portion 48 extending outwardly from the front thereof. Emergency stop controllers are placed on the stacker in various locations. For example, one such controller is shown at 47 on the support structure 38 and another is shown at 49 on the frame 48.

A photocell 50 is mounted on extension 51 which determines if the next succeeding case on the incline conveyor 44 is of a size that it can be deposited on top of the stack being constructed. If the photocell 50 detects a box, that box will not fit in the space between the top of the stack and the top of the enclosed van.

As the cases to be stacked move up the in-feed belt 40 they are deposited on the transition conveyor belt 42. The in-feed conveyor 40 may run, for example, at 81 feet/minute delivering the flow of cases to the loader 34. The transition conveyor 42 may run at 128 feet/minute which causes a slight gap between boxes from the in-feed belt 40.

The cases move from the transition conveyor 42 to the incline conveyor 44. The purpose of the incline conveyor is to move the case to the top of the current column and to provide the proper spacing for loading operations. The incline belt on conveyor 44 may run at 240 feet/minute, for example, which helps pull a gap of approximately one second between boxes or cases. As the case moves along the incline conveyor 44 it may be centered by well known case guides (not shown) on each side of the incline conveyor 44 for more consistent column quality.

From the incline conveyor 44, the case flows onto the speed-up conveyor 46. This conveyor 46 accelerates the case so that it can be lofted onto the current column. The speed-up conveyor may be slave driven off the incline conveyor through a sprocket and chain with a 2:1 ratio and is illustrated in FIG. 9. It may also be driven with its own separate motor 125 as shown in FIG. 8. This speed-up conveyor 46 pivots at its connection to the incline conveyor 44 so that it can direct the cases to the floor of the enclosure as well as maintain a constant angle for consistent lofting of the cases onto the top of the current column being stacked. On the speed-up conveyor 46 there may be an angled left-hand case guide (not shown) that directs the case as it is moving off the speed-up belt 46 to the right so that a tight mode is achieved.

Once the case leaves the speed-up conveyor 46 and is lofted onto the column, it blocks one of the two photoeyes 52 and 52', best shown in FIG. 8, that are mounted on the outer end of the speed-up conveyor 46 and that look forward. Once the photoeye 52 or 52' is blocked by a box, a signal is generated that triggers the vertical axis control to move the incline conveyor 44 with the speed-up conveyor 46 attached thereto upwardly until the photoeye 52 or 52' no longer detects the stacked box, an upper limit is reached, or the photoeye 50 (FIG. 2) is blocked which indicates that the next case cannot be deposited on the stack because of insufficient room. As the vertical axis moves up, the incline linear actuator motor 114 (see FIG. 8) is triggered to move the incline conveyor 44 inwardly on the bottom half of the stroke and outwardly on the top half. This will be explained more clearly in relation to FIG. 6 in which photocells 79, 81, 83, 85, 87, and 89 are shown. Photocell 79 designates the bottom of the enclosure being loaded, and stored in the PLC and is the lowest position of the incline conveyor 44. Photocell 81 represents the lowest position for the deck for the E-van or drop-frame type enclosure. Photocell 83, represents the change of direction of movement of the incline conveyor 44 because it is at its center position. While it is moving upwardly below photocell 83 it moves backwardly or inwardly to maintain the outer end of the speed-up conveyor 46 in a straight line vertically. As the incline conveyor 46 passes photocell 83 the program logic controller (PLC) causes the conveyor 44 and speed-up conveyor 46 to begin to move outwardly to maintain the straight vertical movement at the outer end. Photocell 85 represents the upper limit for a straight-frame van enclosure while photocell 87 represents the upper limit for an E-van, and photocell 89 represents the upper limit for a drop-frame van.

Thus, as the vertical axis of the outer end of the speed-up conveyor is moving upwardly, the incline conveyor linear actuator 114 is triggered to move the incline conveyor 44 in on the bottom half of the stroke and out on the top half. This actuation is necessary to maintain a consistent distance of the outer end of the speed-up conveyor 46 with respect to the column or stack it is building.

Figure 11:
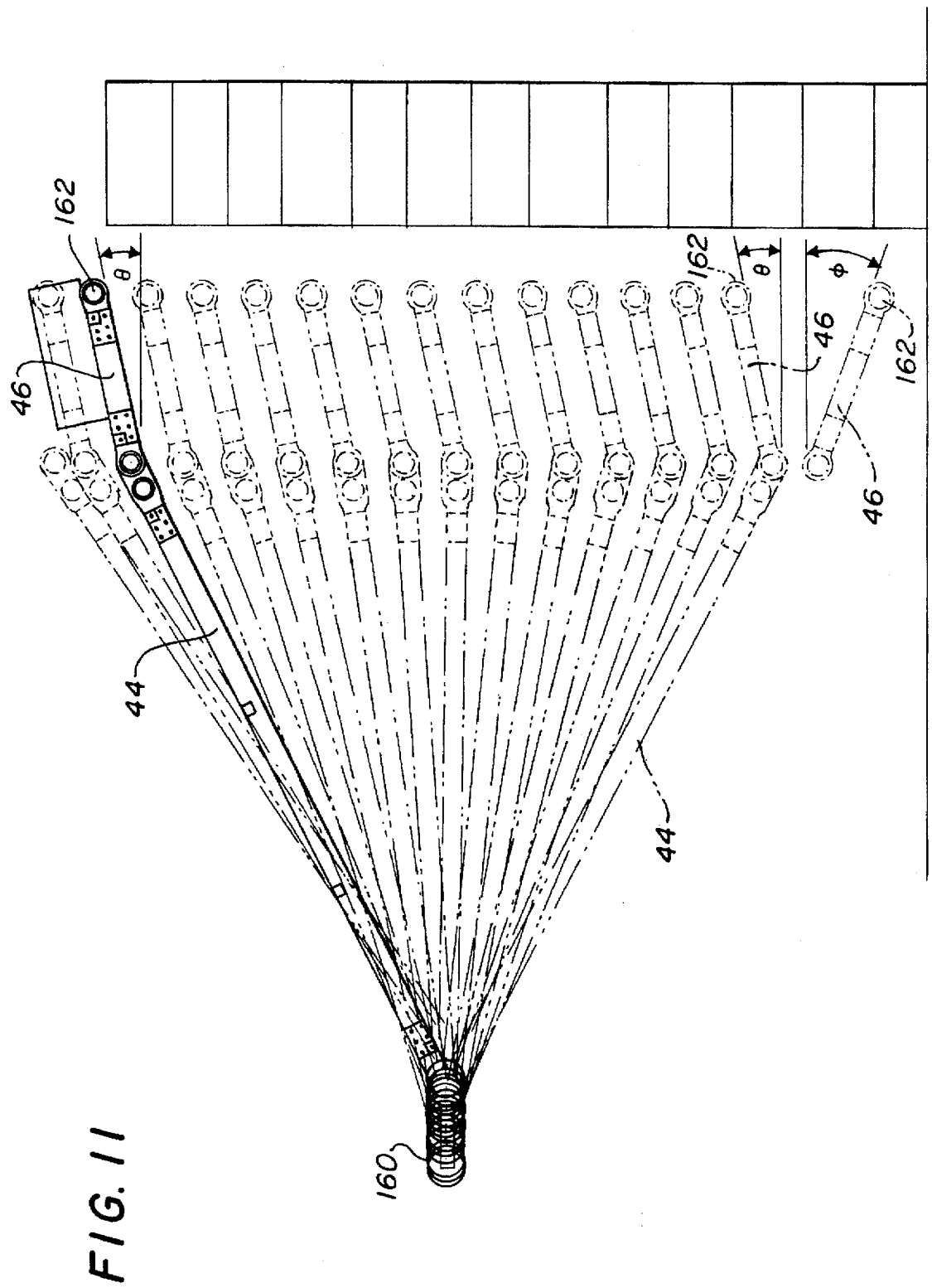
FIG. 11 is a diagrammatic representation of the movement of the incline conveyor 44 and the speed-up conveyor 46 in multiple positions illustrating how the incline conveyor 44 moves upwardly, inwardly, outwardly, and downwardly such that the outer end 162 of the speed-up belt moves upwardly in a straight line and at an angle to the horizontal.

At the beginning of each column or stack, the speed-up conveyor 46 is tilted downwardly toward the trailer floor by the fit actuator 102 (shown in FIG. 8). This tilting is shown by the angle phi (φ) illustrated in FIG. 11 and is approximately 5°–20° below the horizontal in the preferred embodiment. This tilting reduces the distance the first case of each column must travel to reach the trailer floor. As the first case moves off the speed-up conveyor 46 onto the trailer floor, the front photoeyes 52 and 52' are blocked and the fit actuator 102 is triggered to tilt the speed-up conveyor 46 upwardly until it is in its fully up position which, as an be seen in FIG. 11, is the angle theta (θ) above the horizontal and where θ, in the preferred embodiment, is approximately 12°. When it is fully up, the vertical axis drive is triggered to move the outer end of the speed-up conveyor 46 upwardly in a straight line as discussed previously.

Figure 6:
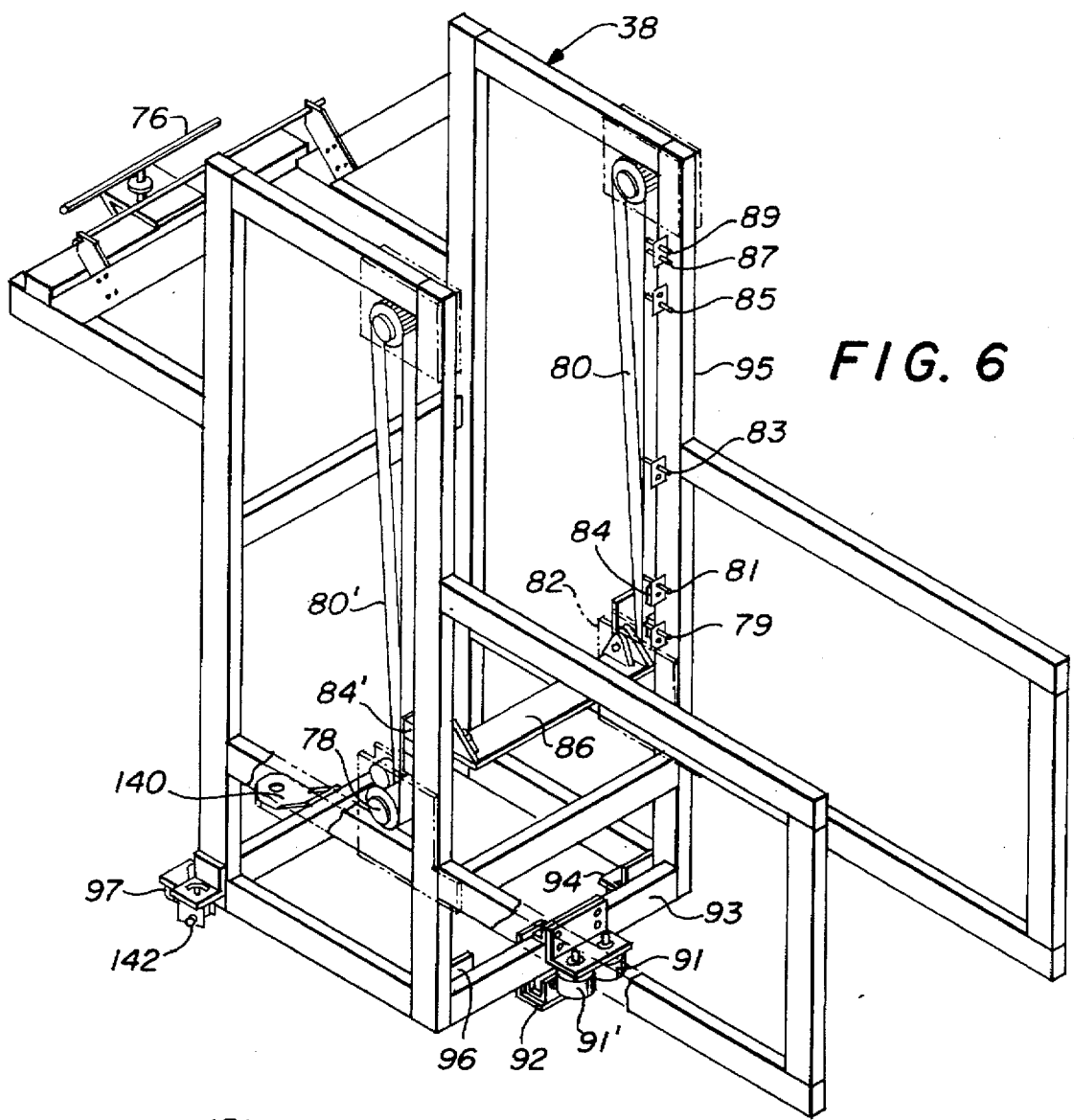
FIG. 6 is a schematic view of the construction of the pivotable frame portion of the novel stacker.
Figure 7:
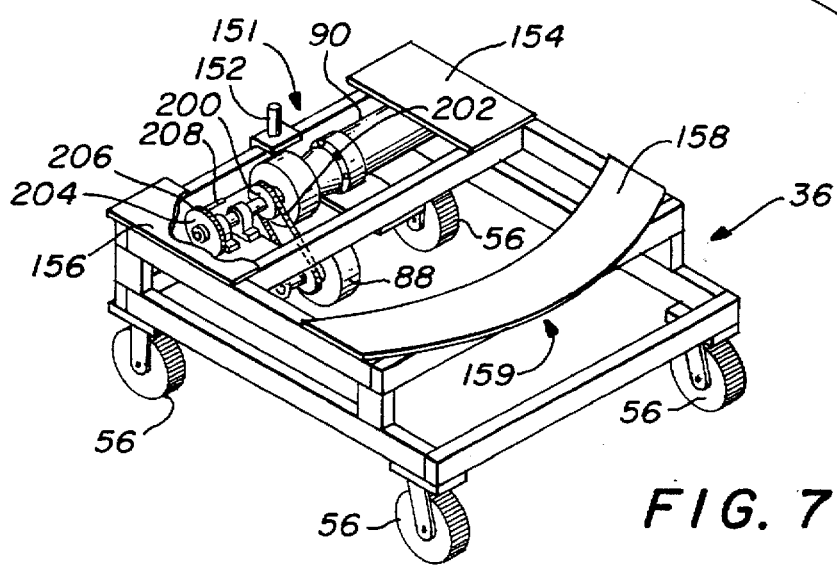
FIG. 7 is a schematic view of the base portion 36 illustrating the pivot point at which the upper pivotal frame portion is mounted, the roller wheel pads, the magnetic brake pad, and the wheels for moving the device.

All of the previously discussed conveyors are mounted on the conveyor support structure 38, shown in FIG. 6, which is a frame that pivots on the base 36, shown in FIG. 7. This pivoting motion allows the outer end of the speed-up conveyor 46 to be directed across the width of the trailer in which the cases are being stacked. This pivot motion is manually accomplished and the support structure 38 is held in place on the base 36 by a set of electromagnets 91 and 91' shown in FIG. 6 that engage brake pad 158 shown in FIG. 7. These magnets are energized and de-energized by "magnet release" button 72 on the operator handle 70 shown in FIG. 5. They are demagnetized when the "complete" button 74 on the operator handle 70 is depressed. The power to swing the conveyor support structure or frame 38 from side-to-side is supplied manually by the operator.

The entire machine is driven forward and backward by a drive wheel 88 powered by an AC motor 90 as shown in FIG. 7. This motor is controlled by two buttons 62 and 64 on the operator control panel shown in FIG. 3. The machine will back up one case length if the reverse button 62 is held continuously. If the reverse button 62 is released, the backing measurement is reset. This distance is measured by a fiberoptic photocell 208, shown in FIG. 7 that counts the teeth 206 in a cog wheel 204 that is turned by motor 90 as it rotates gear 200 to drive wheel 88 with chain 202. When the photocell 208 has counted the appropriate number of teeth representing movement of the machine a distance of one case length, the programmed logic controller stops movement of the machine.

In FIG. 3, the main control panel 59 is shown. It has a touch screen 51, well known in the art, that allows the operator to select a various preprogrammed setting such as the type of van to be loaded so that the programmable logic controller will know where to stop the conveyors in their uppermost and lowermost vertical positions as well as the area of the truck to be loaded. Thus if an E-van is to be loaded such as shown in FIG. 1A, the height of the deck 14 and the bottom 16 of the van will be programmed (through screen 61) so that the incline conveyor 44 will know where to stop. The same thing applies with the drop-frame truck in FIG. 1B and the straight frame or box truck shown in FIG. 1D. Thus the operator screen 61 is used to set the different parameters such as switching between automatic and manual modes, deck height loading or body height loading, trailer type, incline conveyor start and stop and the like. The operation of such screens is old and well known in the art and need not be discussed in detail here. Reset button 63 resets data such as the case rate in cases per hour, the total cases since last reset or elapsed time in minutes since the last reset, thus providing performance measures. The ON/OFF button 65 turns the screen 61 ON or OFF.

The operator panel 58 shown in FIG. 4A has an emergency stop button 60 which, if depressed, removes power to the device and stops all operations. To restart it, the button 60 is simply pulled outwardly. A reverse button 62 and forward button 64 are used in conjunction with manual button 68 for manual operation of the device. Start button 66 supplies power to the unit.

As pointed out earlier, in FIG. 5, on the operator handle 70, is mounted the "magnet release" button 72 and the "stack complete" button 74. When either of these buttons is depressed, the magnets are released so that the conveyor support structure 38 can be pivoted with respect to the base structure 36.

FIG. 6 is a schematic representation of the conveyor support structure 38. It has an attachment device 76 mounted on the top rear thereof for engaging the in-feed conveyor 40 shown in FIG. 2. It also has a belt drive system 80 and 80' that is coupled to a bearing holder 82 and crossbeam 86 which support the incline conveyor 44. A motor 78 drives the belt 80 and 80' to lift the support bar 86 which is attached to mounts 84 and 84' that also engage the belts 80 and 80'. Thus as the mounts 84 and 84' are lifted upwardly or downwardly by the belts 80 and 80', the incline conveyor 44, attached to the bearing holders 82 on each side is also caused to move upwardly and downwardly.

The conveyor support structure 38 is pivotally attached at 140 to the base portion 36 shown in FIG. 7. It pivots on wheels 92, 94, 96, and 97. A forth wheel opposite wheel 97 cannot be seen in FIG. 6 or FIG. 10. These wheels rotate or roll on plates 154, 156, and 158 on the base as shown in FIG. 7. The pivot point 152 in FIG. 7 mates with the pivot point 140 in FIG. 6. It will be noted that wheel 92 is mounted under the frame or conveyor support structure 38 so that it moves under the magnetic brake pad 158 in FIG. 7 to provide stability to the support structure 38 so that it does not tip backwards.

Magnets 91 and 91' are mounted on the front portion of the crossbar 93 in FIG. 6 to engage the magnetic brake pad 158 in FIG. 7.

As explained previously, photocell 79 in FIG. 6 is the body mode bottom limit sensor for the incline conveyor 44, photocell 81 is the deck/wheel well mode bottom limit sensor for the incline conveyor 44, photocell 83 is the midstroke sensor, photocell 85 is the straight-frame trailer upper limit sensor, photocell 87 is the E-van trailer upper limit sensor, and photocell 89 is the drop-frame trailer upper limit sensor. All of these sensors detect the position of the incline conveyor 44 and tell the program logic controller the position of the incline conveyor 44.

Also as stated earlier, the drive wheel 88 is driven by motor 90 to cause the unit to move backwards or forwards.

As stated earlier, the apparatus for controlling forward and backward movement of the device is illustrated clearly in FIG. 7. Motor 90 through gear 200 and drive chain 202 drives wheel 88 to move the stacker forward or in reverse. It also has a wheel 204 with teeth 206 that are counted by photocell 208 so that the program logic controller can cause the device to back up exactly one case length when desired.

Figure 10:
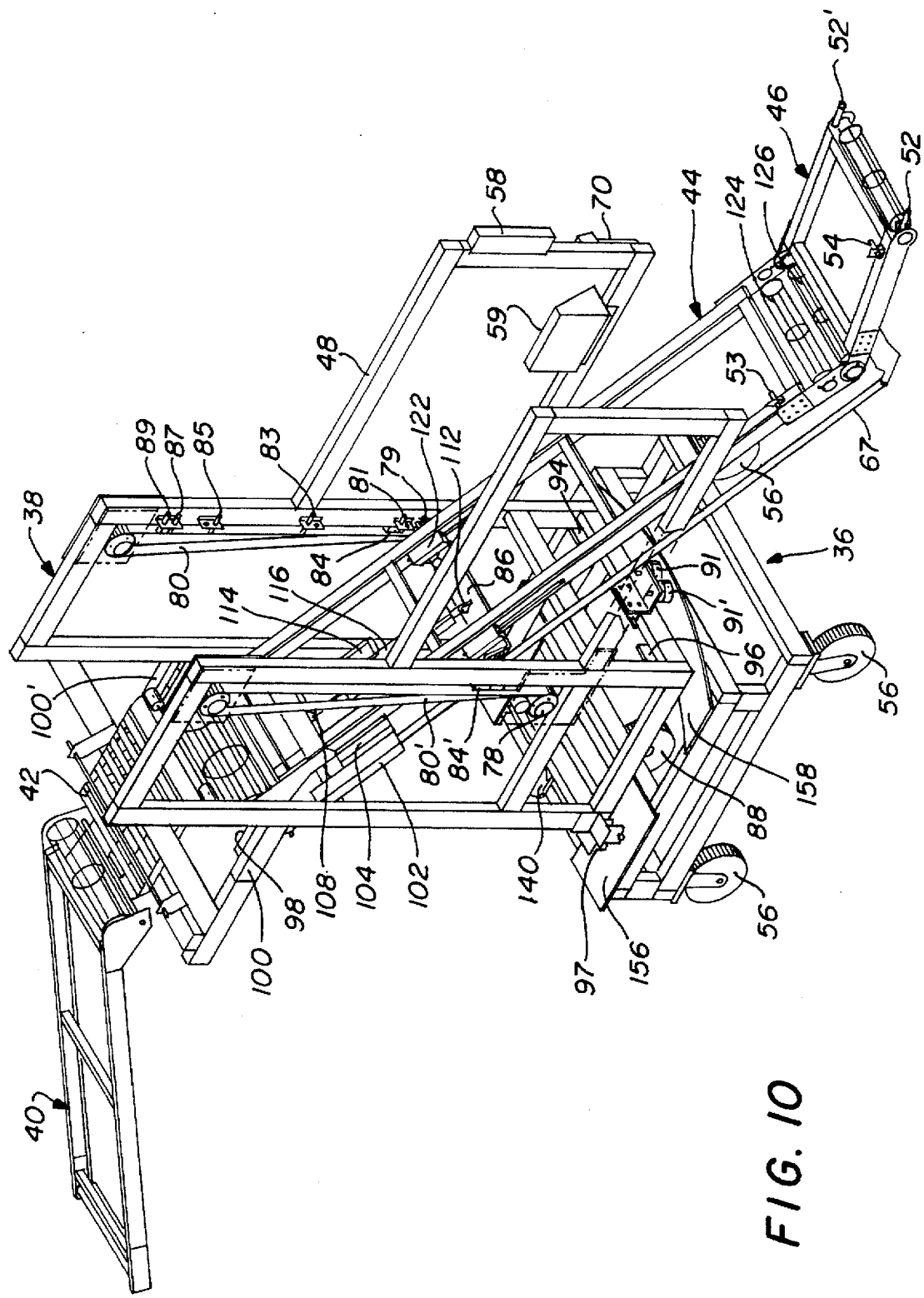
FIG. 10 is a schematic representation of the entire stacker including the base structure and the pivotal conveyor support structure.

FIG. 8 is a schematic arrangement of the conveyors of the present invention. As can be seen, the in-feed conveyor 40 is associated with the transition conveyor 42 to drop the packages or cases on the incline conveyor 44. The speed-up conveyor 46 is attached to the outer end of the incline conveyor 44. Note that the upper rear portion of the incline conveyor 44 is mounted in bearings 98 and 98' which slide along linear bearing rails 100 and 100'. In-and-out linear actuator 116 is driven by motor 114. Actuator 116 is attached at 108 to the incline conveyor 44 and at end 112 to the frame or conveyor support structure 38 as shown in FIG. 10. When the linear actuator motor 114 is driven, it causes the linear actuator 116 to move the incline conveyor outwardly or inwardly along linear bearing rails 100, 100' to enable the outer end of the speed-up conveyor 46 to move upwardly and downwardly along a vertical line as it is raised and lowered. Sensors 118 and 120 under the linear actuator 116 detect its position so that it knows when the incline conveyor 44 has reached its retract limit or its extend limit. The sensors 118 and 120 may be of any well-known type but may be a magnetic arrangement that detects a magnet associated with the actuator 112 to give an indication of its position.

It will be noted in FIG. 8 that linear bearings 122 and 122' are the bearings that are mounted in bearing holders 82 in FIG. 6 so that when the incline conveyor 44 is being moved up or down, it can also move in and out with the linear actuator 116 to maintain the movement of the outer end of the speed-up conveyor 46 in a vertical plane.

Also as can be seen in FIG. 8, a speed-up tilt lever actuator 102 is driven by a motor 104 to cause rod 105 which is connected to speed-up conveyor 46 at 106 to be tilted upwardly or downwardly. Actuator 102 also has sensors associated therewith (not shown) that are similar to sensors 118 and 120 on actuator 116 to indicate the angular position of the speed-up conveyor 46.

A gear 124 on the outer end of incline conveyor 44 may be attached by means of a chain to the gear 126 which drives the conveyor belt for speed-up conveyor 46. As can be seen in FIG. 9, the gear 128 is larger than gear 126 and, in the preferred embodiment, the two gears have a 2:1 ratio such that the speed-up conveyor 46 is driven at twice the speed of the incline conveyor 44. A chain of any well-known type 132 may be used to couple the two gears 128 and 130. Obviously, any other connection means could be used as desired. Also, as indicated earlier, a separate motor 125 could drive the speed-up conveyor 46. This would allow the incline conveyor to be stopped momentarily if the boxes were too close together thereby enabling a box on the speed-up conveyor 46 to be ejected and then the incline conveyor 44 would be started again as explained hereafter.

A photocell 53 is mounted on incline conveyor 44 in a transverse direction to incline conveyor 44 whose sensitivity is adjusted so that it sees a box halfway across the incline conveyor 44. This photocell 53 is a jam detector and, if a box does not pass photocell 53 within a certain length of time, the entire unit is shut down.

In like manner, a photocell 54 is placed on the speed-up conveyor 46 and is focused transversely to the direction of movement of the conveyor belt on speed-up conveyor 46. This photocell 54 serves a dual function. First, it can serve as a jam detector and shut down the machine if the box is not ejected within a certain length of time. Second, it acts as a detector for anticipating the stacking of an article from the speed-up conveyor 46. It is coupled to the controlled motor 78 for driving the vertical bearings 84 and 84' (FIG. 6) to raise and lower the incline conveyor 44. Thus it starts movement of the incline conveyor 44 upwardly to the next position before the anticipated case or box reaches the top of the stack so that the incline conveyor 44 does not have to wait until a case is completely deposited on the stack before beginning to move upwardly. Clearly, it speeds up operation of the device. A clock means in the program logic controller times the passing of an article in front of the photocell 54. The PLC provides a shutdown means that is coupled to the clock means for stopping power to the drive motors to stop all conveyor movement of the boxes or cases when a case does not pass the photocell 54 on the speed-up conveyor 46 in a predetermined period of time as determined by the clock means.

The photocell 53 on the incline conveyor 44 also acts as an article spacing detecting means. It faces the articles circled by the incline conveyor 44 and generates a signal when an article or box passes by the photocell 53. The computer forming part of the program logic controller on the conveyor support portion or frame 38 includes a clock for generating timing pulses. A counter in the computer counts the clock pulses between photocell signals that represent adjacent boxes passing on the incline conveyor 44. A data storage area in the computer stores a number representing a proper spacing between cases on the incline conveyor 44. Comparing means in the computer compares the counted clock pulses with a stored number and generates an output signal if the counted clock pulses are less than the stored number.

The circuit for providing the article spacing detecting means is illustrated schematically in FIG. 4B. A power source 134 is coupled through switch 138 on line 140 to power the stacker. Switch 138 is controlled by a CPU 142 which has therein a timer 144, counter 146, a data storage means 148, and a comparator 150. In this way, the computer can pause movement of certain ones of the conveyors for a predetermined period of time when an output signal is generated by the comparator as explained previously.

FIG. 10 is a schematic arrangement of the entire stacker including the base structure 36 and the upper frame or conveyor support structure 38 pivotally attached to the base portion 36 at pivot point 140. The roller wheel pad 156 and the roller wheel pad and magnetic brake pad 158 can be seen. It is on these pads that wheels described earlier in relation to FIG. 6 ride so that the upper frame or conveyor support structure 38 can pivot on the base portion. Also the vertical linear bearings 84 and 84' can be seen coupled to belts 80 and 80' and to which crossbar 86 of the incline actuator 44 is attached so that the vertical movement of the incline conveyor can be obtained. The in-and-out movement of the incline conveyor 44 is caused by the linear actuator 116 being driven by motor 114 as explained previously. As can be seen in FIG. 10, one end 108 of the linear actuator 116 is attached to the upper frame or conveyor support structure 38 while the other end 112 is attached to crossbar 86 of the incline conveyor 44. Thus when motor 114 drives linear actuator 116, it moves the incline conveyor 44 inwardly and outwardly with respect to horizontal linear bearings 122 and 122'. Also as can be seen in FIG. 10, the upper inner end of incline conveyor 44 is attached to bearings 98 that are slidably mounted in bearing structures 100 and 100' to allow the incline conveyor 44 to move inwardly and outwardly as it moves up and down vertically.

Also as can be seen in FIG. 10, the operators control panel 58 is attached to the outwardly extending frame portion 48. In like manner, the operator handle 70 with the "magnet release" button 72 and the "complete" button 74 is shown.

The photocell 54 on the outer end of speed-up conveyor 46 has its sensitivity adjusted transversely to the direction of movement of the conveyor such that it reflects off of a cardboard box halfway across the speed-up conveyor 46. The front photocells 52 and 52' have their sensitivity adjusted so that they reflect off of a cardboard box 12 inches away from the end of the speed-up conveyor. The photocell 50 shown in FIG. 2 has its sensor adjusted to see one-half of the transverse distance on the conveyor. At the position shown, if a box appears on the conveyor the system is shut down because the box will be too high to be deposited on top of the stack in the space allowed in the enclosed van.

FIG. 10 is a schematic arrangement of the entire stacker illustrating clearly the pivot point 140 and the roller wheels 94, 96, and 97. All of the vertical photocell detectors 79, 81, 83, 85, 87, and 89 can also be seen.

FIG. 7 clearly illustrates the base portion 36 and shows the wheels 56, the drive wheel 88, and the drive motor 90. The roller wheel pads 154, 156, and 158 can also be seen clearly. As stated earlier, the front roller wheel pad 158 is also used as the magnetic brake pad as described previously. Thus the base structure 36 has a front portion 159 and a rear portion 151. On it is mounted the conveyor support structure 38 shown in FIG. 6. The conveyor support structure 38 has a pivot point 140 at the rear portion and wheels 92, 94, and 96 at the front portion.

Reviewing, the incline conveyor 44 as seen in FIGS. 2, 8, and 10 has an article carrier thereon for moving articles such as boxes. The incline conveyor is both pivotally and slidably attached to the conveyor support structure 38 at 98 and 98' and at 122 and 122' for both horizontal and vertical movement with respect to the base structure 36. The incline conveyor 44 has an inner end at horizontal bearings 98 and 98' for receiving boxes and an outer end represented at gear 124 for transferring the boxes to the speed-up conveyor 46 for stacking. Controlled motor 114 moves the incline conveyor inwardly and outwardly while controlled motor 78 moves the incline conveyor upwardly and downwardly with respect to the conveyor support structure 38 while stacking boxes such that the outer end of the incline conveyor 48 is selectively movable vertically in a substantially straight line from a lowest position to a highest position.

A first detector means in the form of photosensors 52 and 52' on the outer end of the speed-up conveyor portion 46 of the incline conveyor 44 detects the deposited boxes and provides a signal to the controlled motors 78 and 114 to stop upward movement of the incline conveyor at the proper location to deposit the next box. A second detector means in the form of photocell 89 is mounted on the conveyor support structure 38 for detecting when the incline conveyor 44 is at its maximum height and stopping movement of the incline conveyor 44 upwardly.

The incline conveyor itself comprises a main conveyor portion 44 having an inner end at bearings 98 for receiving boxes and an outer end at gear 124. A first conveying means such as a conveyor belt supported by the main conveyor 44 transports the boxes. A speed-up conveyor 46 is pivotally attached to the outer end of the main conveyor 44 for pivotal movement in a vertical plane. Second conveyor means in the form of a conveyor belt is supported by the speed-up conveyor 46 for receiving the boxes from the first conveying means and depositing the boxes in a stack. A first drive means in the form of a motor 97 is coupled to and drives the first conveying means while gears 124 and 126 drive the second conveying means on the speed-up conveyor 46. Arm 105 coupled to speed-up tilt linear actuator 102 serves as an adjusting means coupled to the speed-up conveyor 46 for adjusting the angle of the speed-up conveyor with respect to the longitudinal axis of the main conveyor to be in the range of 0 to 20 degrees to provide the proper ejection path necessary for a given article to be deposited on the top of the stack.

A second drive means, gears 124 and 126, drive the second conveying means on speed-up conveyor 46 at a faster rate than the first conveying means on incline conveyor 14 to cause a received box to be ejected in an arcuate path to the top of the stack of boxes being formed.

A first detector means includes first and second spaced photocells 52 and 52' positioned on the outer end of the speed-up conveyor 46 for detecting the presence of the last box deposited in the stack such that, as the speed-up conveyor 46 is moved upwardly, when the first and second spaced photocells 52 and 52' no longer detect the presence of the last deposited article, a signal is generated and coupled to controlled motor 78 to stop the upward movement of the main conveyor 44 at the proper location to enable the speed-up conveyor 46 to deposit the next article on top of the stack.

A second detector or means include a third photocell 50 positioned on the conveyor support structure such that when the incline conveyor 44 is added to maximum vertical height, a box exceeding a predetermined height is detected by the third photocell and a signal is generated to the first and second drive means to stop movement of the conveyors.

A third detector means 54 on the speed-up conveyor 46 anticipates the stacking of a box from the speed-up conveyor 46. Photocell 54 is coupled to controlled motor 78 for generating a start movement signal to start movement of the incline conveyor 44 upwardly to the next position before the anticipated article or box reaches the top of the stack so that the incline conveyor 44 does not have to wait until a box is completely deposited on the stack before beginning to move upwardly.

The third detector means 54 also forms a jam detector for stopping the conveyors if an article stops on the speed-up conveyor 46 and does not pass the photocell 54 within a predetermined period of time. The third detector 54 includes a photocell positioned on the speed-up conveyor 46 that faces laterally toward boxes moving on the speed-up conveyor 46. The photocell generates the start upward movement signal when the box on the speed-up conveyor 46 completely passes the photocell 54. Clock means or counter 146 (FIG. 4B) times the passing of an article in front of the photocell 54. Shutdown means in the form of switch 138 (FIG. 4A) coupled to the clock means 148 removes power to the drive motor 97 to stop all conveyor movement of the articles when an article does not pass the photocell 54 on the speed-up conveyor 46 in a predetermined period of time as determined by the clock means or counter 146.

An article spacing detecting means in the form of photocell 53 on incline conveyor 44 is also coupled to the drive motors 78 and 97 to shut down the conveyor support system if spacing of the boxes does not meet the predetermined requirements. The photocell 53 is placed on the incline conveyor 44 facing boxes carried by the first conveying means for generating a signal when a box passes by the photocell 53. Again, a computer having timer 144 for generating timing pulses, counter 146 for counting clock pulses or timing pulses between photocell signals that represent adjacent articles or boxes passing on the incline conveyor 44, storage means 148 in the computer 142 for storing a number representing a proper spacing between boxes on the incline conveyor 44, and comparing means 150 in the computer 142 compares the counted clock pulses with the stored number and generates an output signal if the counted clock pulses are less than the stored number. If so, switch 138 opens and removes power to the controlled motors 97 and 78 for pausing movement of the incline conveyor 44 for a predetermined period of time when the output signal is generated.

Powered wheel 88 is attached to the rear portion of the base 36 for moving the stacker. Motor 90 is coupled to the powered wheel to drive the wheel. Manually operated switch 68 (FIG. 4A) energizes the motor to cause selective movement of the semiautomatic stacker forward and backward any desired amount. The computer 142 has stored in the memory 148 data representing substantially one box length. The "complete stack" button 74 (FIG. 5) is coupled to the computer 142 and to the motor 90 coupled to the powered wheel drive 88 to cause movement of the semiautomatic stacker backward substantially only one box length according to the data stored in the computer memory 148 when the "complete stack" button 74 is depressed.

As stated earlier, bearings 98 and 98' pivotally and slidably attach the upper end of the incline conveyor 44 to the conveyor support structure 38 in a cantilevered fashion such that the incline conveyor 44 extends outwardly beyond the conveyor support structure 38.

An arcuate metal plate 158 is mounted on the top of the front portion of the base 36. Connection 140 under substantially the center of the rear portion of the conveyor support structure pivotally connects the conveyor support structure to substantially the center of the top of the rear portion of the base 36 such that the forward portion of the conveyor support structure 38 is movable in arcuate path with respect to the base 36. At least one wheel 92 on the bottom of the forward portion of the conveyor support structure 36 rides under the arcuate metal plate 158 and supports the conveyor support structure during pivotal movement thereof. In like manner, two spaced wheels 94 and 96 on the top of the forward portion of the conveyor support structure rides on top of the arcuate metal plate 158 and supports the conveyor support structure during pivotal movement thereof.

Magnetic brakes 91 and 91' on the front portion of the conveyor support structure 36 provide magnetic engagement with the arcuate metal plate 150 for locking the conveyor support structure 38 to the base portion 36 in any position along the arcuate path. A magnet release switch 72 on the conveyor support structure 38 disengages the magnetic brake 91 and 91' to allow pivotal movement of the conveyor support structure along the arcuate path.

The main control panel 59 in FIG. 3 has an input panel in the form of touch screen 61 that is coupled to the computer 142 for selecting data stored in the memory 148 including data representing the lowest and highest position of the incline conveyor 44, the length of the box being stacked, the maximum height of a stack of boxes to be created, and the starting height of a given level on which a stack is to be created. A switch 138 is coupled to the controlled motors 78 for vertical movement of the incline conveyor 44 for causing the incline conveyor 44 to seek the starting height of a stack to be created according to the data stored in the computer memory 148 and selected through the input panel 61.

A first sprocket gear 124 on the outer end of the incline conveyor 44 or conveyor belt carrying structure, rotates with movement of the conveyor belt. A second sprocket gear 126 on the inner end of the speed-up belt carrying structure, or speed-up conveyor 46, drives the speed-up conveyor belt. A drive chain 132 couples the first sprocket gear 124 to the second sprocket gear 126 such that the first sprocket gear 124 drives the second sprocket gear 126. The ratio of the number of the sprockets on the first and second gears 124 and 126, respectively, is such that the second sprocket gear 126 turns faster than the first sprocket gear 124 to eject the boxes from the speed-up belt.

Tilt linear actuator 102 and arm 105 form an angle adjusting means coupled to the speed-up conveyor 46 for changing the angle of the speed-up conveyor 46 with respect to the horizontal to provide a proper ejection path for a given box to be deposited on top of the stack.

Thus in summary, the semiautomatic box stacker includes a movable structure comprised of the base structure 36 and the conveyor support structure 38, a conveyor belt carrying structure 44 having an inner end pivotally attached in a cantilevered fashion through horizontal bearings 98 and 98' to the conveyor support structure 38, the conveyor belt carrying structure having an outer end and carrying spaced boxes thereon to be stacked, a speed-up belt carrying structure 46 having an inner end attached to the outer end of the conveyor belt carrying structure for receiving boxes from the conveyor belt, lift means 80 and 80' and 84 and 84' for automatically raising the conveyor belt carrying structure 44 in predetermined increments to successively deposit boxes on a stack, and drive means including motor 97 and gears 124 and 126 for driving the speed-up belt 46 at a greater speed than the conveyor belt 44 to eject the boxes from the speed-up belt 46 onto the stack.

After a stack has been completed, the "complete stack" button 74 (FIG. 5) is a manually actuated control means that selectively causes the conveyor belt (incline conveyor 44) to return to the lowest position when the stack is completed so another stack can be started.

FIG. 11 illustrates the incline conveyor 44 in its various vertical positions and illustrates how the pivotal end 160 slides in horizontal bearings 98 and 98' to move inwardly and outwardly so that the outer end of the incline conveyor 44, and thus the speed-up conveyor 46 and its outer end 162, moves upwardly and downwardly in a vertical plane. It also illustrates the angle phi, φ, at which the speed-up conveyor is placed below horizontal to deposit the first box on the floor and then the angle theta, θ, to indicate the angle of the speed-up conveyor 46 above the horizontal to eject the boxes on top of the stack. In FIGS. 12–17, the manner in which a drop-frame trailer is loaded is shown.

Figure 12:
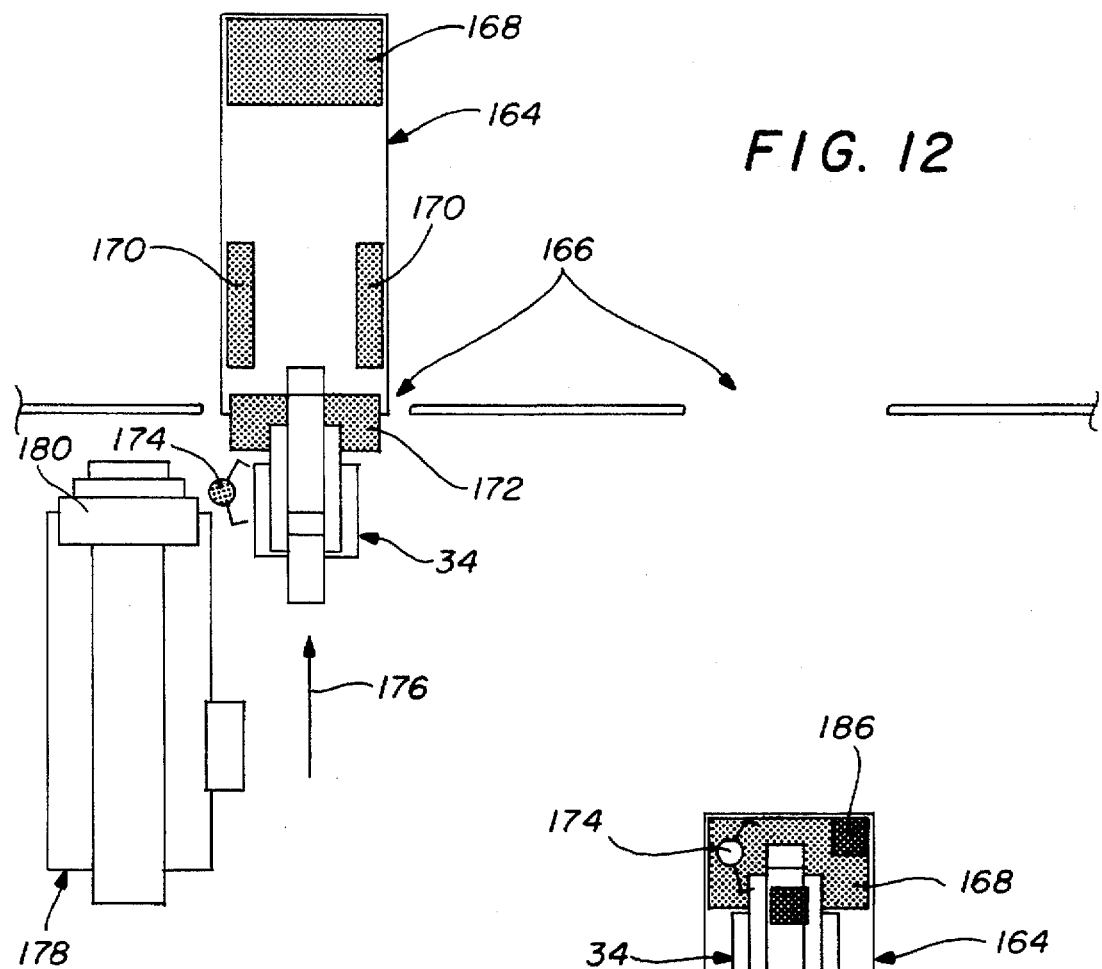
FIGS. 12–17 illustrate how boxes are stacked in an enclosed van using the present invention.

In FIG. 12, the D-frame trailer 164 is backed up to a dock door 166 for loading. It has a front deck portion 168 and wheel well raised portions 170. A plate 172 connects the dock area with the interior of the truck for trailer 164. An operator 174 controls the semiautomatic box stacker 34 and guides it in the direction of arrow 176 into the truck or trailer 164 to be loaded. Unit 178 contains telescoping booms 180 that will feed the boxes to be stacked to the semiautomatic box stacker 34.

Figure 13:
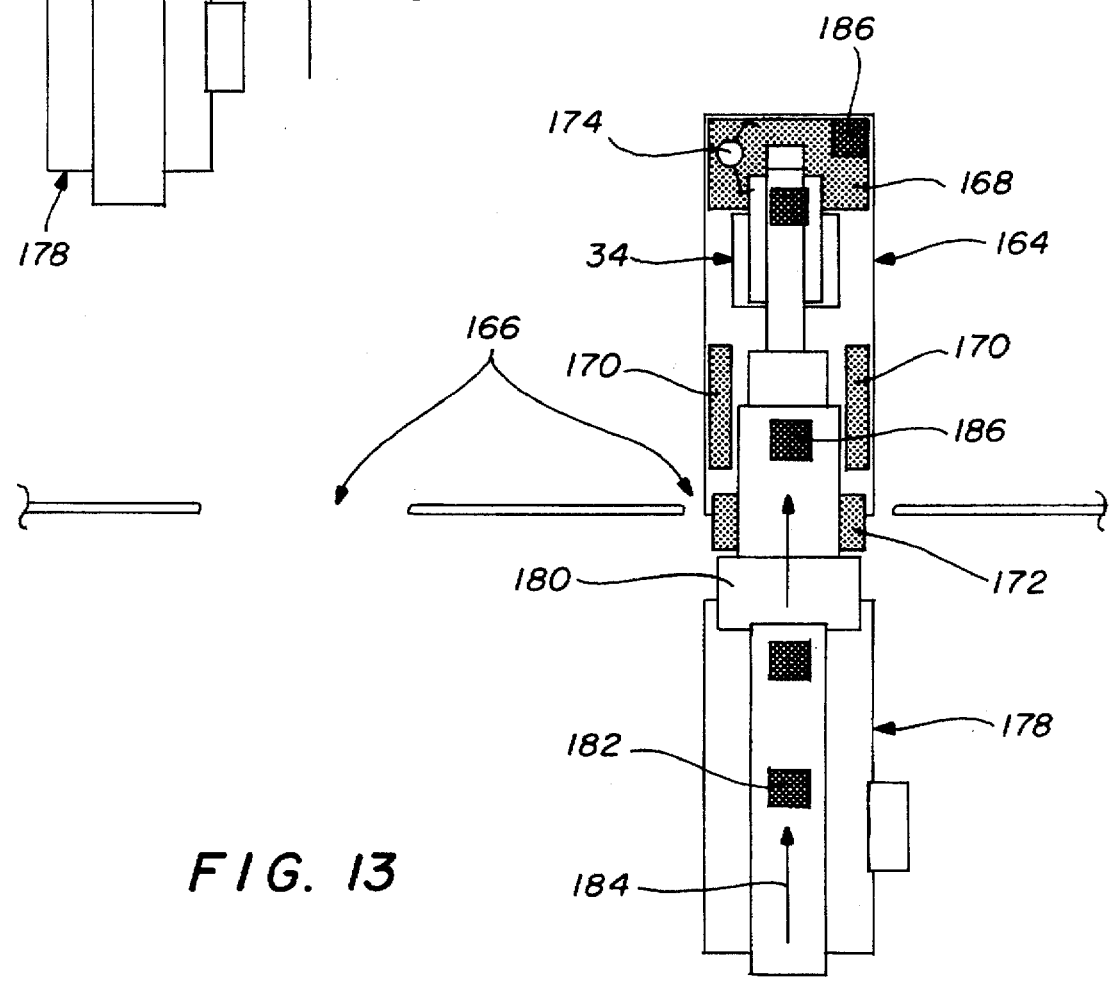
Figure 14:
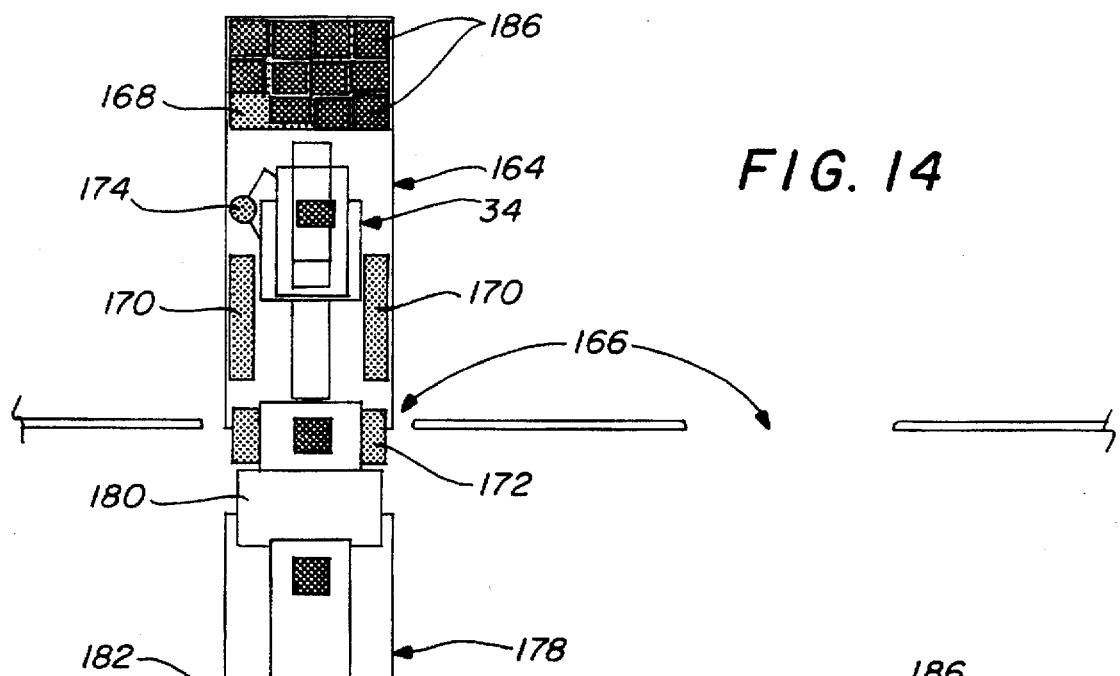
Figure 15:
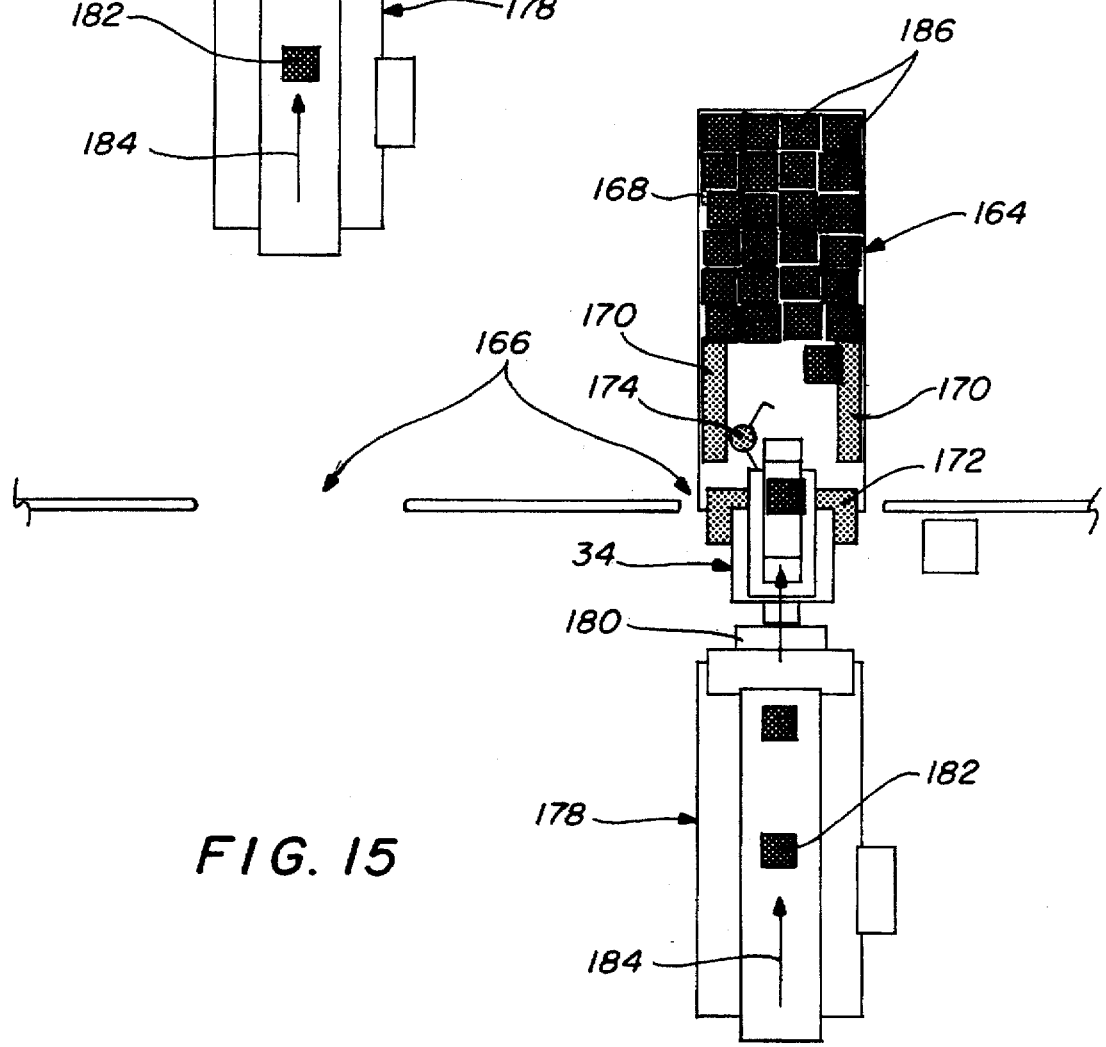

In FIG. 13, the semiautomatic box stacker 34 has been guided into the truck or trailer 164 to be loaded. The unit 178 shows the telescoping booms in enclosure 180 extended to carry boxes 182 onto the in-feed belt of the semiautomatic stacker 34. The operator may load the first row on deck 168 manually depending on the type of D-frame trailer used. The semiautomatic box stacker then completes the loading to the point illustrated in FIG. 14 where the deck 168 has been filled except for the last column of the last row which is loaded by the operator manually. The incline conveyor 44 is then dropped to the lowest floor of the D-frame 164 and automatically stacks boxes until the point shown in FIG. 15 when the wheel wells 170 are reached. The semiautomatic box stacker is then placed in the auto deck mode and the columns on the wheel wells 170 are loaded. The semiautomatic box stacker is then set to the auto body mode and the columns on the floor are loaded. The semiautomatic box stacker is then again set in the auto deck mode and the columns are stacked on the other wheel well 170. This process is repeated until the boxes are stacked over the wheel wells 170.

Figure 16:
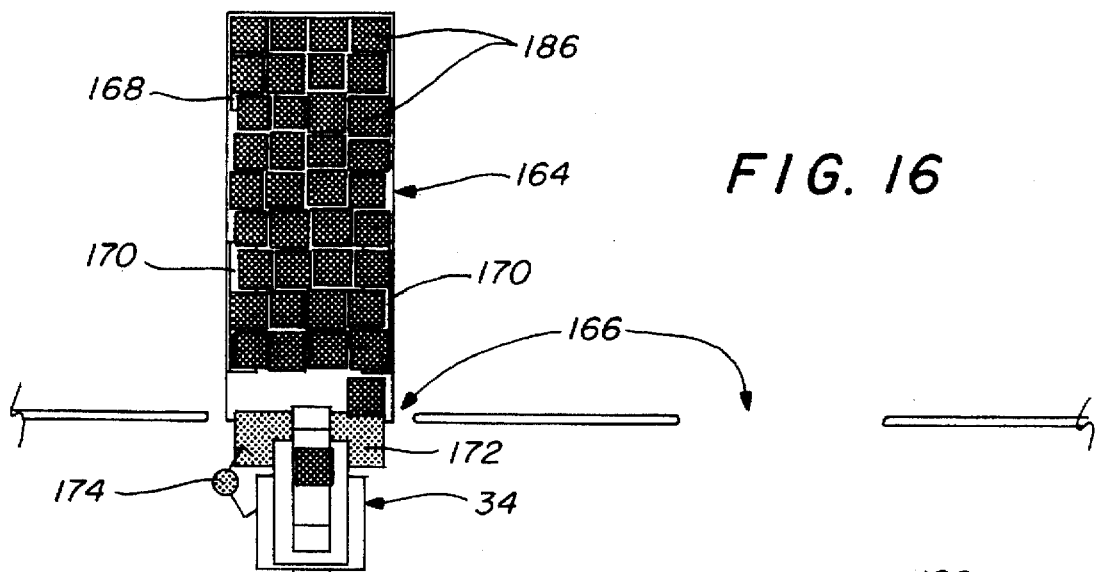
Figure 17:
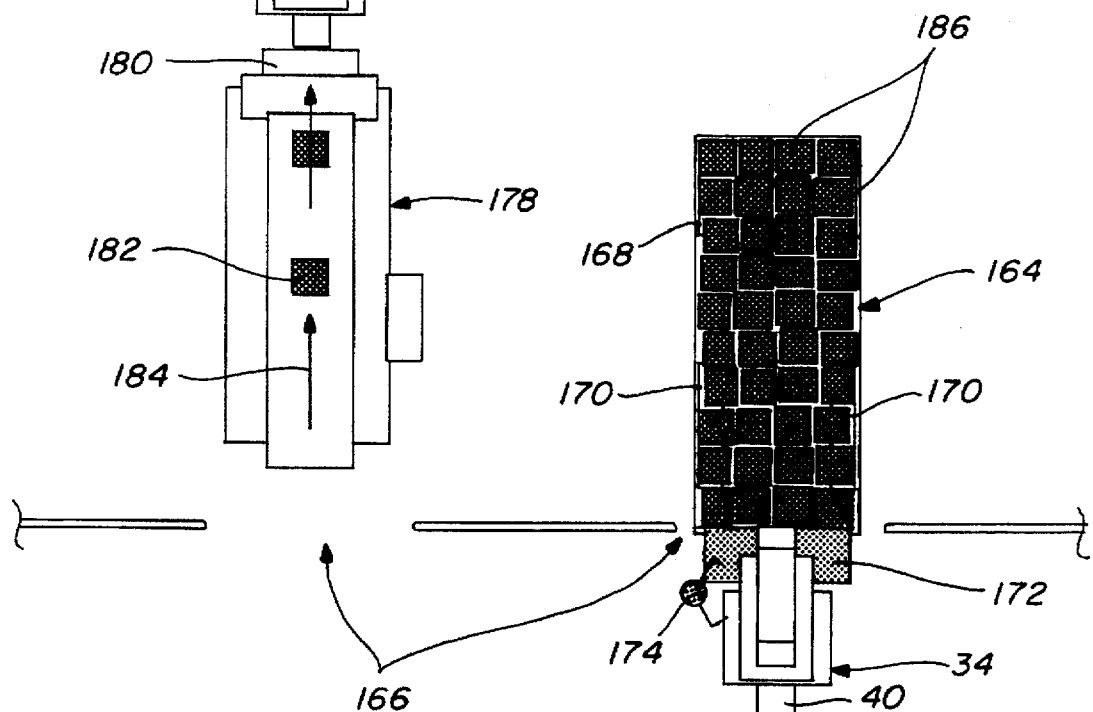

As can be seen in FIG. 16, after the wheel wells have been loaded, the semiautomatic box stacker is placed in the auto body mode and the remainder of the trailer is loaded up to the end thereof. In FIG. 17, the in-feed conveyor 40 of the semiautomatic box stacker 34 is unhitched from the telescoping boom device and the telescoping boom device is moved out of the way and the semiautomatic box stacker is moved away from the truck.

Thus there has been disclosed a semiautomatic stacker for stackable articles such as boxes including a base structure having a front portion and a rear portion, a conveyor support structure mounted on the base and having a front portion and a rear portion. An incline conveyor having an article carrier thereon for moving the articles is both pivotally and slidably attached to the conveyor support structure for both horizontal and vertical movement with respect to the base structure. The incline conveyor has an inner end for receiving boxes or articles and an outer end for depositing the boxes or articles in a stack. Controlled motors automatically move the incline conveyor up inwardly, upwardly, and outwardly with respect to the conveyor support structure while stacking boxes such that the outer end of the incline conveyor is selectively movable vertically in a substantially straight line from a lowest position to a highest position. First detector means is placed on the outer end of the incline conveyor for detecting the deposited articles and providing the signal to the controlled motors to stop upward movement of the incline conveyor at the proper location to deposit the next article. Second detector means is mounted on the conveyor support structure for detecting when the incline conveyor is at its maximum height and stopping movement of the incline conveyor.

The incline conveyor further includes a main conveyor having an inner end for receiving articles and an outer end, first conveying means supported by the main conveyor for transporting the articles, a speed-up conveyor pivotally attached to the outer end of the main conveyor for pivotal movement in a vertical plane, and the second conveying means supported by the speed-up conveyor from receiving the articles from the first conveying means and depositing the articles in a stack. First and second drive devices are coupled to and drive first and second conveying devices, respectively. Adjusting means is coupled to the speed-up conveyor for adjusting the angle of the speed-up conveyor with respect to the horizontal to be in the range of 0–20 degrees to provide the proper ejection path necessary for a given article to be deposited on the top of the stack.

The second drive device drives the second conveying apparatus at a faster rate than the first conveying apparatus is driven to cause a received box to be ejected in an arcuate path to the top of the stack of boxes being formed.

Further, the first detectors include first and second spaced photocells positioned on the outer end of the speed-up conveyor for detecting the presence of the last box deposited in the stack such that, as the speed-up conveyor moves upwardly, when the first and second spaced photocells no longer detect the presence of the last deposited article, a signal is generated and coupled to one of the controlled motors to stop the upward movement of the main conveyor at the proper location to enable the speed-up conveyor to deposit the next box on top of the stack. The second detector includes a third photocell positioned on the conveyor support structure such that when the incline conveyor is at its maximum vertical height, an article exceeding a predetermined height is detected by the third photocell and a signal is generated to the first and second drive devices to stop movement of the conveyors.

A third detector is placed on the speed-up conveyor for anticipating the stacking of a box from the speed-up conveyor. It is coupled to the controlled motors for generating a start movement signal to start movement of the incline conveyor upwardly to the next position before the anticipated article reaches the top of the stack so that the incline conveyor does not have to wait until an article or box is completely deposited on the stack before beginning to move upwardly.

Further, the third detector forms a jam detector for stopping the conveyors if an article stops on the speed-up conveyor and does not pass the photocell.

The third detector includes a photocell positioned on the speed-up conveyor and facing laterally toward boxes moving on the speed-up conveyor. The photocell generates a start upward movement signal when the box on the speed-up conveyor completely passes the photocell. A clock times the passing of a box in front of the photocell and stops power to the drive motor to stop all conveyor movement of the boxes when a box does not pass the photocell on the speed-up conveyor in a predetermined of time as determined by the clock.

An article spacing detecting device is coupled to the first and second drive motors to shut down the conveyor support system if the spacing of the articles does not meet predetermined requirements. The article spacing detector includes a photocell on the incline conveyor facing articles carried by the first conveyor for generating a signal when a box passes by the photocell. The computer has a clock that generates timing pulses and a counter that counts the timing pulses between photocell signals that represent adjacent boxes passing on the first conveyor. A data storage memory in the computer stores the number representing a proper spacing between the articles on the conveyor. A comparator in the computer compares the counted clock pulses with the stored number and generates an output signal if the counted clock pulses are less than the stored number. If the output signal is generated, it causes a motor that is coupled to the computer and to the first drive device to pause movement of the first conveying device for a predetermined period of time.

The semiautomatic box stacker also includes a powered wheel on the base portion for moving the semiautomatic stacker. A motor is coupled to the powered wheel to drive wheel. A first manually operated control energizes the motor to cause selected movement of the semiautomatic stacker forward and backward any desired amount. The computer mounted on the semiautomatic stacker has a memory for storing data representing substantially only one box length. A second control coupled to the computer and to the motor energizes the motor to cause movement of the semiautomatic stacker backwards substantially only one article length according to data stored in the computer memory.

The incline conveyor is both pivotally and slidably attached to the conveyor support structure in a cantilevered fashion such that the incline conveyor extends outwardly beyond the conveyor support structure and can move upwardly with its outer end in a straight line.

An arcuate metal plate is mounted on top of the front portion of the base portion and a pivotal connection is made under substantially the center of the rear portion of the conveyor support structure to substantially the center of the top of the rear portion of the base portion such that the forward portion of the conveyor support structure is movable in an arcuate path with respect to the base portion. At least one wheel is formed on the bottom of the forward portion of the conveyor support structure to prevent it from tipping backward for riding under the arcuate metal plate and supporting the conveyor support structure during pivotal movement thereof.

A magnetic brake is formed on the front portion of a conveyor support structure for magnetic engagement with the arcuate metal plate for locking the conveyor support structure to the base portion in any position along the arcuate path. A release switch on the conveyor support structure disengages the magnetic brake to allow pivotal movement of the conveyor support structure along the arcuate path.

An input panel is coupled to the computer for selecting data stored in the computer memory including data representing the lowest and highest position of the incline conveyor, the length of the box being stacked, the maximal height of a stack of articles to be created, and the starting height of a given level on which a stack is to be created depending upon the vehicle in which the boxes are being stacked and a switch is coupled to the controlled motor for vertical movement of the incline conveyor to cause the incline conveyor to seek the starting height of a stack to be created according to the data stored in the computer memory and selected through the input panel.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. A stacker uniquely able to semiautomatically load, in place, inside a variety of trailer types, columns of stackable articles, said stacker including:

a base structure having a front portion and a rear portion;

a conveyor support structure pivotally mounted on said base for horizontal arcuate movement and having a front portion and a rear portion;

an incline conveyor for moving said articles, said incline conveyor being both pivotally and slidably attached to the conveyor support structure for both elongated horizontal movement and vertical movement with respect to the base structure, said incline conveyor having an inner end for receiving articles and an outer end for depositing articles in a stack;

controlled motors for automatically moving said incline conveyor inwardly, upwardly, and outwardly with respect to said conveyor support structure while stacking articles such that the outer end of said incline conveyor is selectively movable vertically in a substantially straight line from a lowest position to a highest position;

first detector means on the outer end of said incline conveyor for detecting each of said deposited articles and providing a signal to said controlled motors to stop upward movement of the incline conveyor at the proper location to deposit the next article; and second detector means mounted on the conveyor support structure for detecting when said incline conveyor is at its maximum height and stopping movement of said incline conveyor.

2. A semiautomatic stacker as in claim 1 wherein said incline conveyor further includes:

a main conveyor having an inner end for receiving articles to be transported and an outer end;

a speed-up conveyor pivotally attached to the outer end of the main conveyor for pivotal movement in a vertical plane and for depositing said articles in said stack;

first and second drive means coupled to and driving first and second conveying means, respectively; and adjusting means coupled to said speed-up conveyor for adjusting the angle of the speed-up conveyor with respect to the horizontal to be at a constant angle in the range of 0°–20° to provide the proper ejection path necessary for a given article to be deposited on the top of the stack.

3. A semiautomatic stacker as in claim 2 wherein:

said second drive means drives said second conveying means at a faster rate than said first conveying means is driven to cause a received article to be ejected in an arcuate path to the top of the stack of articles being formed.

4. A semiautomatic stacker as in claim 2 wherein said first detector means includes:

first and second spaced photocells positioned on the speed-up conveyor for detecting the presence, on the stack of the last article deposited in said stack such that, as said speed-up conveyor moves upwardly, when said first and second spaced photocells no longer detect the presence of the last deposited article, a signal is generated and coupled to one of said controlled motors to stop said upward movement of said main conveyor at the proper location to enable the speed-up conveyor to deposit the next article on the top of the stack.

5. A semiautomatic stacker as in claim 4 wherein said second detector means includes a third photocell positioned on said conveyor support structure such that when said incline conveyor is at its maximum vertical height, an article exceeding a predetermined height is detected by said third photocell and a signal is generated to said first and second drive means to stop movement of said conveyors.

6. A semiautomatic stacker as in claim 2 further including:

third detector means on said speed-up conveyor for anticipating the stacking of an article from said speed-up conveyor; and said third detector means coupled to said controlled motors for generating a start movement signal to start movement of said incline conveyor upwardly to the next position before the anticipated article reaches the top of the stack so that the incline conveyor does not have to wait until an article is completely deposited on said stack before beginning to move upwardly.

7. A semiautomatic article stacker as in claim 6 wherein said third detector means includes:

a photocell positioned on said speed-up conveyor and facing laterally toward articles moving on said speed-up conveyor;

said photocell generating said start upward movement signal when said article on said speed-up conveyor completely passes said photocell;

clock means for timing the passing of an article in front of said photocell; and shut-down means coupled to said clock means for removing power to said drive motor to stop all conveyor movement of said articles when an article does not pass said photocell on said speed-up conveyor in a predetermined period of time as determined by said clock means.

8. A semiautomatic stacker as in claim 1 further including:

a powered wheel on said base structure for moving said semiautomatic stacker;

a motor coupled to said powered wheel to drive said wheel;

a first manually operated control for energizing said motor to cause selective movement of said semiautomatic stacker forward and backward any desired amount;

a computer mounted on said semiautomatic stacker;

a memory in said computer for storing data representing substantially only one article length; and a second control coupled to said computer and to said motor for energizing said motor to cause movement of said semiautomatic stacker backward substantially only one article length according to the data stored in said computer memory.

9. A semiautomatic stacker as in claim 1 further including:

a computer on said conveyor support structure;

a memory in said computer for storing data;

an input panel coupled to said computer for selecting data stored in said memory including data representing the lowest and highest position of said incline conveyor, the length of the article being stacked, the maximum height of a stack of articles to be created, and the starting height of a given level on which a stack is to be created; and switch means coupled to said controlled motor for vertical movement of said incline conveyor for causing said incline conveyor to seek the starting height of a stack to be created according to said data stored in said computer memory and selected through said input panel.

* * * * *